July 16, 1968  IB STEINMETZ-SCHMALTZ  3,393,047
METHOD FOR CONVERTING NITRIC OXIDE TO NITROGEN
DIOXIDE AND RECOVERY THEREOF
Filed Sept. 19, 1966
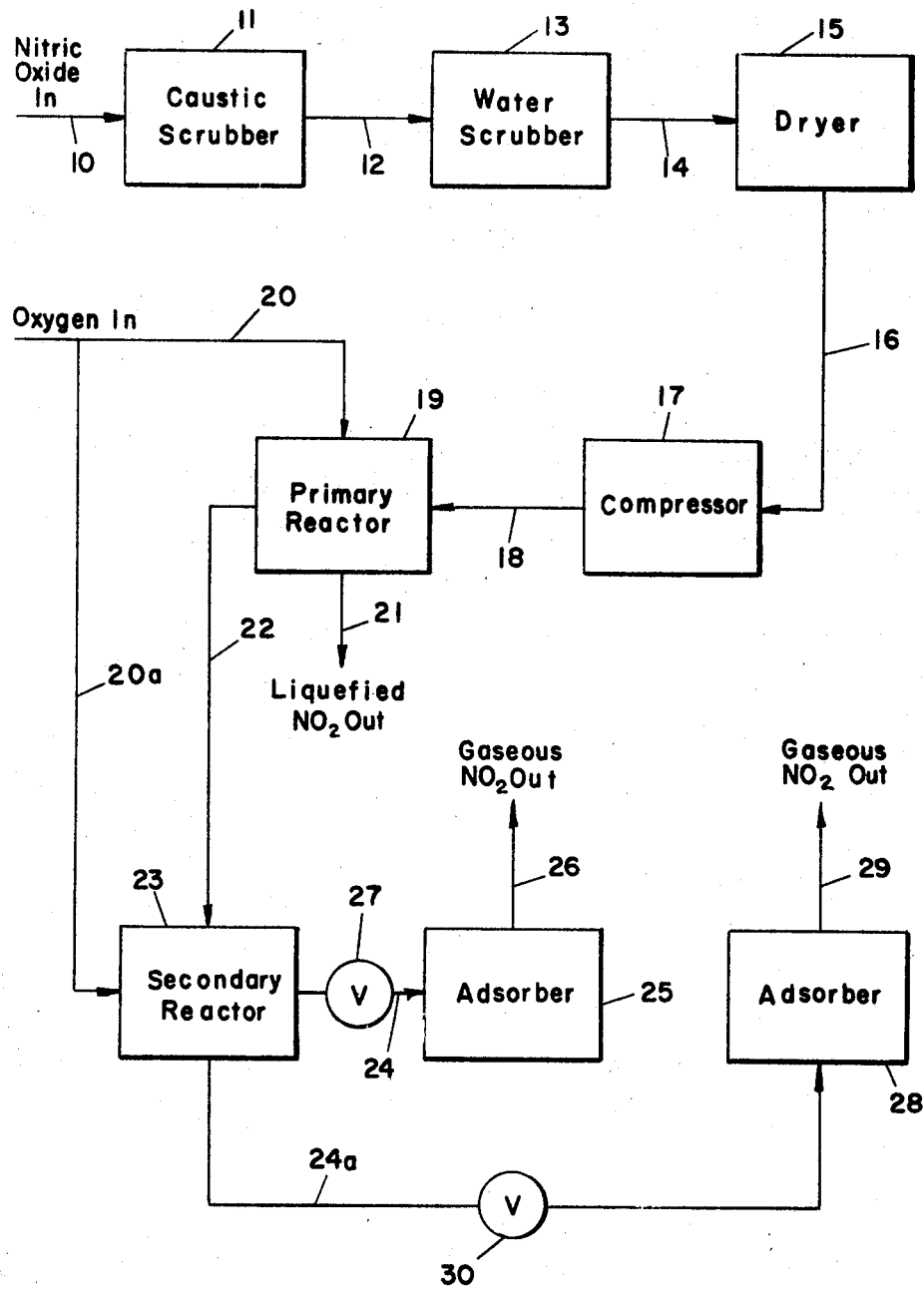
INVENTOR.
IB STEINMETZ-SCHMALTZ
BY George L. Church
ATTORNEY

United States Patent Office 3,393,047
Patented July 16, 1968

3,393,047
METHOD FOR CONVERTING NITRIC OXIDE TO NITROGEN DIOXIDE AND RECOVERY THEREOF
Ib Steinmetz-Schmaltz, The Timbers, Del., assignor to Sun Oil Company, Philadelphia, Pa., a corporation of New Jersey
Continuation-in-part of application Ser. No. 263,778, Mar. 8, 1963. This application Sept. 19, 1966, Ser. No. 584,308
9 Claims. (Cl. 23—157)

ABSTRACT OF THE DISCLOSURE

Dry nitric oxide, free from acidic and alkaline impurities, is converted to nitrogen dioxide by treatment in a reactor with an excess of a free oxygen containing gas at a temperature in the range of about 0° F. to 350° F. and at a pressure sufficient to at least partially liquefy the nitrogen dioxide formed. The residual unreacted nitric oxide containing gas is catalytically oxidized in another reactor, in the presence of an additional amount of a free oxygen containing gas for the further production of nitrogen dioxide in the gaseous state, the temperature being in the range of about 70° F. to 350° F. and the positive pressure being below 150 p.s.i.a.

---

This application is a continuation-in-part of United States Ser. No. 263,778, filed Mar. 8, 1963, and now abandoned.

This invention relates to a method of converting nitric oxide to nitrogen dioxide. More particularly this invention relates to a method for converting either nitric oxide or nitric oxide contained in admixture with other gases to nitrogen dioxide and recovering the nitrogen dioxide therefrom.

Recently the use of 2,6-naphthalene dicarboxylic acid and other naphthalene dicarboxylic acids have become increasingly more valuable as starting materials in the preparation of polymers for the formation of fibers and films. One method that has been proposed for the preparation of 2,6-naphthalene dicarboxylic acid involves the oxidation of 2,6-dimethylnaphthalene with nitrogen dioxide. In the course of this reaction the nitrogen dioxide is reduced to nitric oxide. While such an oxidation process using nitrogen dioxide is of value to prepare naphthalene dicarboxylic acids, it would be desirable to recover the nitric oxide produced in the process and economically convert it to nitrogen dioxide which may then be reused in the oxidation process.

In addition to the preparation of naphthalene dicarboxylic acids by the oxidation of 2,6-dimethylnaphthalene with nitrogen dioxide, other valuable materials have been prepared by oxidation with nitrogen dioxide. For example, xylene has been oxidized to phthalic acid, pseudocumene has been oxidized to trimellitic acid, acenaphthene has been oxidized to the corresponding quinone, and anthracene has been oxidized to anthraquinone.

Heretofore several methods have been proposed for converting nitric oxide to nitrogen dioxide. According to one method a mixture of air and from 1 to 3 percent nitric oxide is passed through a large chamber to convert the nitric oxide to nitrogen dioxide. The nitrogen dioxide is then dissolved in water to form a dilute solution of nitric acid.

In another method, a concentrated nitrogen dioxide product is obtained from a gaseous mixture containing only a few percent of nitric oxide by the use of oxygen and includes the steps of cooling the nitric oxide containing gaseous mixture and drying the mixture by passing it through or over a solid adsorbent. The dry gas mixture is then contacted with a catalyst mass to oxidize the nitric oxide to nitrogen dioxide at the expense of the oxygen contained in the gas mixture. The dry gas mixture is then passed into contact with particles of a solid adsorbent such as silica gel which has the property of adsorbing the nitrogen dioxide. The nitrogen dioxide is then desorbed by heating and subsequently recovered.

The latter described prior art process for the oxidation of nitric oxide to nitrogen dioxide has an inherent disadvantage in that process limitations preclude the quantitative conversion of the nitric oxide to nitrogen dioxide and furthermore, due to the exothermic heat of reaction, the conversion has been limited to gaseous mixtures containing only relatively small amounts of nitric oxide, i.e., less than about 20 percent.

A method has now been found whereby nitric oxide can be essentially quantitatively converted to nitrogen dioxide.

According to the present invention nitric oxide, or nitric oxide contained in admixture with other gaseous materials in substantial amounts (i.e., greater than 20 percent), is converted to nitrogen dioxide by a unique combination of process steps.

If the nitric oxide is contained in admixture with other gases, the mixture is first washed with an aqueous alkaline solution to remove any acidic gases contained therein such as HCl, $N_2O$, or $CO_2$. The alkaline solution, which can be an aqueous solution of an alkali metal hydroxide including ammonium hydroxide or an alkali metal carbonate including ammonium carbonate or an alkaline earth hydroxide has a concentration of about 5 to 25 percent by weight, preferably 10 to 15 percent by weight. Such concentrations are not critical, however, and stronger concentrations can be used if desired. It is preferable to use an alkali metal hydroxide solution and most preferable to use an aqueous solution of sodium hydroxide or potassium hydroxide.

The gaseous mixture (which is essentially nitric oxide and water vapor) emanating from the alkaline wash is then washed with water to remove any entrained alkaline material. This water wash also serves to cool the gas mixture to ambient temperatures or below.

The nitric oxide, which as above indicated is substantially free of acidic as well as alkaline impurities, admixed with water vapor is then passed through a bed of a solid adsorbent having a preferential adsorptability toward water. In such a manner there is produced an essentially dry gas which is essentially nitric oxide. It is essential that any water vapor contained in the gaseous mixture be removed therefrom prior to subsequent process steps. If this water is not removed, it will react with the nitrogen dioxide and substantially reduce the yield of nitrogen dioxide ultimately received. Suitable solid adsorbents which can be used to remove the water include silica gel, molecular sieves, etc.

Obviously if pure nitric oxide is used as a starting material in the instant process, the purification pretreatments described above need not be employed. Nevertheless, it is preferred in the instant invention to pass the nitric oxide over a solid adsorbent as a precaution against the possibility of any water vapor contained therein reacting with the desired nitrogen dioxide product.

The dried nitric oxide is passed at a positive pressure ranging from about atmospheric up to about 1000 p.s.i.a. or greater, preferably at a pressure ranging between about 150–200 p.s.i.a., to a primary reactor. Into this primary reactor there is introduced an excess of a free oxygen containing gas such as air or oxygen which reacts with the nitric oxide to form nitrogen dioxide. The temperature in the reactor is maintained at between about 0° F. and 350° F., preferably between 70° F. and 150° F. and most preferably between 140° F. and 150° F. The preferred temperature limitation of 150° F. is imposed in order that the conversion of nitric oxide to nitrogen dioxide be maximized. If this temperature is exceeded, any $NO_2$ produced may be decomposed to nitric oxide and oxygen in accordance with the reversible reaction, $$2NO+O_2 \rightleftharpoons 2NO_2$$

In this primary reactor the reaction conditions of pressure and temperature are so adjusted that the reactants are in the gaseous or vapor phase and the nitrogen dioxide produced will be at least partially liquefied for ease of removal from the reactor. The conversion of nitric oxide to nitrogen dioxide in this primary reactor is of the order of magnitude of 95–96%.

The unreacted nitric oxide evolving from the primary reactor is passed to a secondary reactor containing a catalyst mass which will accelerate the oxidation of the nitric oxide to nitrogen dioxide. This catalyst can be exemplified by silica gel, activated carbon, or titania gel. A free oxygen containing gas such as air or oxygen is also introduced into the secondary reactor.

The secondary reactor is maintained at a positive pressure below 150 p.s.i.a. The temperature in the secondary reactor is maintained at a temperature in the range of from about 70° F. to about 350° F., preferably 70° F. to 150° F. and most preferably 140° F. to 150° F. These conditions of temperature and pressure are such that at any temperature in the ranges indicated, at any positive pressure not exceeding 150 p.s.i.a., the nitrogen dioxide will remain in the gaseous state.

The nitrogen dioxide produced in the secondary reactor by the interaction of the nitric oxide and oxygen along with other gaseous materials is passed to an adsorber containing a bed of adsorbent which will preferentially adsorb the nitrogen dioxide contained in the gaseous mixture. Suitable adsorbents include silica gel, titania gel, etc. The nitrogen dioxide is recovered from the adsorbent by conventional means such as direct heating or by passage of hot air or hot nitrogen dioxide over the bed.

The efficiency of the secondary reactor is about 95%; thus the overall efficiency of the instant process for the conversion of nitric oxide to nitrogen dioxide is in excess of 99%.

This invention will be further understood by reference to the attached drawing which is a schematic flow diagram adapted for practicing the process of the instant invention.

A nitric oxide containing gaseous mixture obtained from a source (not shown) and having a composition as follows:

| Gas: | Mol percent (dry basis) |
| --- | --- |
| NO | 92.2 |
| $N_2O$ | 1.1 |
| $N_2$ | 0.7 |
| $CO_2$ | 4.0 |
| HCl | 2.0 | is passed through conduit 10 to a caustic scrubber 11 containing a 10% by weight solution of sodium hydroxide. The deacidulated gases are passed through conduit 12 to water scrubber 13. Through conduit 14 the gases are passed to dryer 15 containing silica gel. The gas (which is essentially nitric oxide and will be so referred to hereinafter) from dryer 15 is passed through conduit 16 to compressor 17 where it is put under a pressure of 170 p.s.i.a. at a temperature of 140° F. The compressed nitric oxide is passed through conduit 18 to primary reactor 19. Oxygen obtained from a source (not shown) is introduced into the primary reactor 19 through conduit 20. Liquefied nitrogen dioxide is removed from the primary reactor through conduit 21. Unreacted nitric oxide and other gases are passed from the primary reactor through conduit 22 to secondary reactor 23. The secondary reactor contains a catalyst bed of silica gel. Oxygen is introduced into the secondary reactor through conduit 20a. The temperature in the secondary reactor is maintained at 140° F. while the pressure therein is maintained at 120 p.s.i.a. The gases from secondary reactor 23 are passed through conduit 24 to adsorber 25 containing a bed of silica gel which preferentially adsorbs the nitrogen dioxide contained in the gaseous mixture. Small amounts of unreacted nitric oxide and excess oxygen are vented through conduit 26. When the bed of silica gel in adsorber 25 becomes saturated with nitrogen dioxide, valve 27 is closed and the gases from secondary reactor 23 are passed through conduit 24a to adsorber 28. Heat is applied to the bed of silica gel contained in adsorber 25 to desorb the nitrogen dioxide through conduit 26. As the bed of silica gel in adsorber 28 becomes saturated with nitrogen dioxide, valve 30 is closed and valve 27 is opened, thus allowing a constant adsorption and desorption of gaseous nitrogen dioxide from the beds of silica gel.

While specific examples and preferred embodiments for the practice of this invention have been set forth above, it will be understood that various obvious and equivalent modifications may be made without departing from the spirit of the invention and the scope of the appended claims.

The invention claimed is:
1. Method for converting nitric oxide to nitrogen dioxide and recovery thereof which comprises
   (a) introducing essentially dry nitric oxide, substantially free of acidic and alkaline impurities, and an excess of a free oxygen containing gas into a primary reactor,
   (b) maintaining said reactor at a temperature of from about 0° F. to 350° F.,
   (c) maintaining a positive pressure in said reactor sufficiently high to cause liquefaction of nitrogen dioxide at the temperature employed, said temperature and pressure being adjusted to maintain the reactants in the gaseous phase,
   (d) recovering liquid nitrogen dioxide from said reactor,
   (e) passing unreacted nitric oxide from the primary reactor and an additional amount of a free oxygen containing gas to a secondary reactor containing a catalyst material for the oxidation of nitric oxide to nitrogen dioxide,
   (f) maintaining said secondary reactor at a temperature of from about 70° F. to 350° F.,
   (g) maintaining a positive pressure below 150 p.s.i.a. in said secondary reactor, and
   (h) separating and recovering nitrogen dioxide.
2. Method in accordance with claim 1 wherein the free oxygen containing gas is selected from the group consisting of air and oxygen.
3. Method in accordance with claim 1 wherein the temperature in the primary and secondary reactors is in the range of 70° F. to 150° F.
4. Method in accordance with claim 1 wherein the pressure in the primary reactor is in the range of 150 p.s.i.a. to 200 p.s.i.a.
5. Method in accordance with claim 1 wherein the catalyst contained in the secondary reactor is selected from the group consisting of silica gel, activated carbon, and titania gel.
6. Method in accordance with claim 1 wherein the temperature in the primary and secondary reactors is in the range of 140° F. and 150° F.
7. Method in accordance with claim 6 wherein the pressure in the primary reactor is in the range of 150 p.s.i.a. to 200 p.s.i.a.
8. Method in accordance with claim 6 wherein the catalyst contained in the secondary reactor is selected from the group consisting of silica gel, activated carbon, and titania gel.
9. Method for converting nitric oxide to nitrogen dioxide and recovery thereof which comprises
   (a) introducing essentially dry nitric oxide, substantially free of acidic and alkaline impurities, and an excess of a free oxygen containing gas into a primary reactor, (b) maintaining said reactor at a temperature in the range of 140° F. to 150° F., (c) maintaining the pressure in said reactor at a pressure in the range of 150 p.s.i.a. to 200 p.s.i.a., (d) recovering liquid nitrogen dioxide from said reactor, (e) passing unreacted nitric oxide from the primary reactor and an additional amount of a free oxygen containing gas to a secondary reactor containing silica gel as a catalytic material for the oxidation of nitric oxide to nitrogen dioxide, (f) maintaining said secondary reactor at a temperature in the range of 140° F. to 150° F., (g) maintaining a positive pressure of less than 150 p.s.i.a. in said secondary reactor and (h) separating and recovering nitrogen dioxide.

References Cited
UNITED STATES PATENTS

| | | | |
|---|---|---|---|
| 1,989,267 | 1/1935 | Caro et al. | 23—162 XR |
| 2,568,396 | 9/1951 | James | 23—162 XR |
| 2,674,338 | 4/1954 | Lindsay et al. | 23—157 |
| 3,063,804 | 11/1962 | Morrow | 23—162 |
| 3,101,255 | 8/1963 | Carr et al. | 23—162 |

FOREIGN PATENTS

| | | |
|---|---|---|
| 803,211 | 10/1958 | Great Britain. |
| 458,877 | 8/1949 | Canada. |
| 1,122,777 | 5/1956 | France. |

OSCAR R. VERTIZ, *Primary Examiner.*

B. H. LEVENSON, *Assistant Examiner.*